United States Patent [19]
Staats

[11] Patent Number: 5,029,265
[45] Date of Patent: Jul. 2, 1991

[54] MOTOR CONTROLLER HAVING A CONTROL LOOP FOR NEUTRALIZING ROTOR LEAKAGE AND MAGNETIZING REACTANCES

[76] Inventor: Gustav W. Staats, 6124 N. Lake Dr., Whitefish Bay, Wis. 53217

[21] Appl. No.: 463,511

[22] Filed: Jan. 11, 1990

[51] Int. Cl.$^5$ .............................................. H02P 1/42
[52] U.S. Cl. .................................. 318/729; 318/745; 318/796; 318/815
[58] Field of Search ............... 318/798, 745, 796, 773, 318/729, 814, 815, 432, 433, 438

[56] References Cited

U.S. PATENT DOCUMENTS

| | | | |
|---|---|---|---|
| 602,921 | 4/1898 | Steinmetz | 318/729 |
| 1,597,937 | 8/1926 | Wagner . | |
| 1,908,522 | 1/1932 | Lyden . | |
| 2,040,763 | 12/1932 | Summers | 171/119 |
| 2,498,475 | 5/1948 | Adams | 323/89 |
| 2,646,537 | 9/1951 | Lewus | 318/221 |
| 2,646,538 | 9/1951 | Lewus | 318/221 |
| 2,648,808 | 8/1953 | Tiede | 318/814 |
| 2,727,197 | 6/1953 | Lewus | 318/220 |
| 2,727,198 | 4/1954 | Lewus | 318/220 |
| 2,958,816 | 11/1960 | Fischer | 318/493 |
| 3,628,074 | 12/1971 | Fabbrini | 310/72 |
| 4,152,630 | 5/1979 | Wanlass | 318/796 |
| 4,450,399 | 5/1984 | Tanaka | 318/814 |
| 4,772,814 | 9/1988 | Lewus | 310/72 |
| 4,794,288 | 12/1988 | Lewus | 310/68 |
| 4,808,868 | 2/1989 | Roberts | 310/68 R |
| 4,914,375 | 4/1990 | Hatanaka | 318/729 |

FOREIGN PATENT DOCUMENTS

55-37839  3/1980  Japan .
617704  4/1949  United Kingdom .

*Primary Examiner*—William M. Shoop, Jr.
*Assistant Examiner*—John W. Cabeca
*Attorney, Agent, or Firm*—Fuller, Ryan & Hohenfeldt

[57] ABSTRACT

An improved motor controller is intended for use with an induction motor and has a control loop which includes an auxiliary winding, a capacitor and a saturable reactor. The auxiliary winding is electro-magnetically coupled to the stator winding in a manner such that the capacitive reactance of the control loop is effectively in parallel with the magnetizing reactance and the rotor leakage reactance of the motor. The control loop is devoid of any direct electrical connection to the motor. By varying the magnitude of current in its D-C control winding, the inductance of the reactor is adjusted so that the capacitive reactance of the control loop, as electro-magnetically reflected into the motor, is generally in resonance with the parallel combination of the magnetizing reactance and the rotor leakage reactance. Adjustment of reactor inductance, and therefore of the capacitive reactance of the control loop, may be in steps or in a continuum, either instance being based on a motor parameter such as speed or applied frequency. The output torque of the motor is improved and, in many operating conditions, the magnitude of the motor current is maintained or even reduced even though torque is increased.

18 Claims, 5 Drawing Sheets

MOTOR CONTROLLER HAVING A CONTROL LOOP FOR NEUTRALIZING ROTOR LEAKAGE AND MAGNETIZING REACTANCES

FIELD OF THE INVENTION

This invention is related generally to controls for electric motors and, more particularly, to an induction motor controller having a control loop for neutralizing rotor leakage and magnetizing reactances over a range of motor speeds and applied voltage frequencies. Output torque and other motor characteristics are thereby improved.

BACKGROUND OF THE INVENTION

The characteristics of single phase and multi-phase induction motors are generally well known. This is so, irrespective of whether the motor is of the standard squirrel cage type intended to operate at a fixed line frequency, e.g., 60 Hz, or whether the motor is intended to operate at an applied line frequency which varies. The latter situation results when a frequency controlled inverter is used to power the motor.

One known characteristic is that an induction motor which operates at a constant voltage and line frequency exhibits an output torque which, at some motor speeds experienced at startup and during acceleration, is undesirable for certain applications. That is, its output torque tends to be relatively low at standstill and increases gradually to a maximum torque value at an intermediate speed of about 75-80% of rated speed. This torque is sometimes called the breakdown or stall torque. That is, an imposed load which presents a torque requirement greater than the breakdown torque will cause the motor to stall. Induction motors powered from a constant voltage, constant frequency source are widely used. In fact, such installations are among the most common found anywhere.

The relatively low torque available at standstill means that for certain types of loads, e.g., those having higher torque requirements, the load acceleration time may be undesirably long. Even more undesirable is the fact that during acceleration, the motor current is well in excess of that which prevails at rated load and rated speed. Motor overheating and, possibly, physical damage can result.

Somewhat the same kind of difficulty attends the use of variable frequency controllers applied with common induction motors. Such controllers are often embodied as frequency inverters and include a variable frequency supply in which the ratio of voltage magnitude to frequency is maintained substantially constant over the entire frequency range.

This known technique maintains a substantially constant level of magnetic flux in the motor. Such an inverter-based drive system provides the ability to operate the motor at different speeds under load. An additional benefit is that such a drive system provides an increased output torque at reduced motor current for each starting energization of the motor.

For induction motors powered by a constant voltage, constant frequency source, the relatively low starting and acceleration torque characteristics are due in large part to the presence of leakage and magnetizing reactances. Similarly, the benefits obtainable from an inverter-based variable frequency drive system used with an induction motor tend to be limited by the same factors.

Control designers have recognized some of the foregoing disadvantages and have attempted to overcome them with additional control elements. An example of such an effort is shown in U.S. Pat. No. 4,063,135. This apparatus adds capacitors to the motor stator circuit, one of which is controllably switched in and out of the circuit.

The apparatus in U.S. Pat. No. 4,675,565 recognizes the desirability of using resonant circuits to improve motor performance while the apparatus of U.S. Pat. No. 4,808,868 uses what are termed quasi resonant circuits. Other designers have used non-linear control circuit elements (U.S. Pat. No. 2,040,763), chokes (U.K. Specification No. 617,704) or variable resistors (U.S Pat. No. 4,450,399) as motor control elements. The apparatus of U.S. Pat. No. 2,646,538 uses a saturable reactor and a capacitor to modify motor characteristics, both of these elements being of fixed value and electrically connected to the motor circuit.

While these earlier efforts have achieved a degree of success in improving the performance characteristics of induction motors, they have failed to appreciate the best manner in which the output torque and other characteristics of such a motor may be improved, irrespective of whether the motor is operated at a voltage having a variable or a fixed applied frequency.

More specifically, they have failed to recognize the way in which a capacitive reactance may be electromagnetically reflected into the motor circuit and how the value of this capacitive reactance may be controlled as a function of either one of two motor parameters. For an induction motor operated at a fixed line frequency, the parameter is speed as viewed substantially from standstill to rated speed. For a motor having a variable frequency applied thereto, the parameter is the applied frequency.

An improved motor controller which electromagnetically introduces a capacitive reactance into the motor circuit for neutralizing rotor leakage and magnetizing reactances and which varies this capacitive reactance in accordance with a motor parameter to provide improved output torque and, in certain instances, reduced motor current would be an important advance in the art.

OBJECTS OF THE INVENTION

It is an object of the invention to provide an improved motor controller which overcomes some of the problems and shortcomings of the prior art.

Another object of the invention is to provide an improved controller which introduces a capacitive reactance into the motor electromagnetic circuit.

Another object of the invention is to provide an improved controller wherein the value of the capacitive reactance is adjustably controlled in view of a motor parameter.

Yet another object of the invention is to provide an improved controller which causes an induction motor to exhibit significantly increased output torque over a range of motor speeds.

Another object of the invention is to provide an improved controller which is useful with an induction motor operated at a constant line frequency.

Still another object of the invention is to provide an improved controller which can be used with an induction motor operated at a variable line frequency.

These and other important objects will be apparent from the descriptions of the invention which follow.

SUMMARY OF THE INVENTION

The inventive controller is intended for use with an induction motor of the type having a magnetizing reactance, a stator leakage reactance, a rotor leakage reactance, a stator having at least one stator winding and rotor mounted for rotation in an electromagnetically coupled relationship to the stator. All or essentially all induction motors have these characteristics.

The controller has a control loop which includes an auxiliary winding, a capacitor and a saturable reactor connected in series with one another to form a control loop. The auxiliary winding is electro-magnetically coupled to the stator winding in a manner such that the capacitive reactance of the control loop is effectively in parallel with the magnetizing reactance and the rotor leakage reactance of the motor. The control loop is devoid of any direct electrical connection to the motor.

By varying the magnitude of current in its D-C control winding, the inductance of the reactor is adjusted. In a highly preferred embodiment, reactor inductance is adjusted so that the capacitive reactance of the control loop, as electro-magnetically reflected into the motor, is generally in resonance with the parallel combination of the magnetizing reactance and the rotor leakage reactance. The output torque of the motor is improved and, in many operating conditions, the magnitude of the motor current is maintained or even reduced even though torque is increased.

When used with an induction motor in a constant voltage, constant frequency drive system, adjustment of reactor reactance involves detection of a signal which represents a motor parameter, instantaneous motor speed. This detected signal is used to vary the magnitude of the D-C current in the reactor control winding, thereby controlling the inductive reactance of the reactor. By so doing, the capacitive reactance of the control loop can be made to be substantially resonant with the parallel of magnetizing reactance and rotor leakage reactance at speeds ranging from very low up to rated speed.

For induction motor drive systems employing a variable frequency inverter, the detected signal represents the motor parameter of frequency applied to the motor terminals. The capacitive reactance of the control loop is similarly adjusted with changes in the applied frequency. Irrespective of the frequency applied to the motor within a relatively broad band of frequencies, the capacitive reactance of the control loop is made to be generally resonant with the magnetizing reactance and the rotor leakage reactance.

The controller is useful with both single phase and multi-phase machines. In the latter instance, a control loop is provided for each stator winding However, the magnitudes of the reactor D-C control currents can be controlled in unison and at essentially the same value for all control windings.

When the magnetizing reactance and the rotor leakage reactance are obtained, the value of the capacitor used in a given control loop is selected by postulating a control loop which is devoid of the reactor, i.e., where the reactor main winding is hypothetically short-circuited. Selection is made based on the per-phase equivalent circuit of the motor and in view of the assumed maximum frequency of the voltage to be applied to the motor terminals. This approach is used, irrespective of whether the motor will be used with a constant frequency or a variable frequency source. It is this maximum frequency which will determine maximum capacitor size. When so selected, the capacitive reactance electromagnetically available from a control loop will permit substantial resonance with the parallel combination of the magnetizing reactance and the rotor leakage reactance to be obtained at all motor speeds and at all motor applied frequencies.

DETAILED DESCRIPTIONS OF PREFERRED EMBODIMENTS

The figures depict a controller 10 in accordance with the invention. However, before describing the controller 10, certain background information regarding motor equivalent circuits and characteristics of saturable reactors, induction motors and frequency converters will be helpful.

Motor Equivalent Circuits

Figure 1:
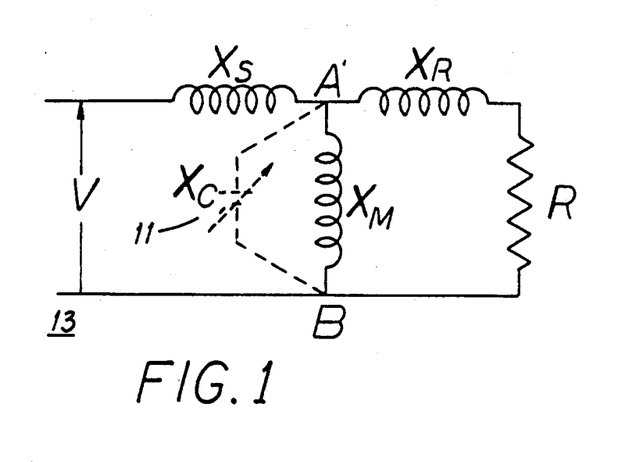
FIG. 1 shows a per-phase equivalent circuit of a three phase induction motor with a capacitive reactance shown in dotted outline.

Referring first to FIG. 1 and disregarding for the moment the variable capacitor 11 shown in dotted outline, the per-phase equivalent circuit 13 of a three phase induction motor is shown to include a stator leakage reactance XS, a rotor leakage reactance XR, and a magnetizing reactance XM. The resistor R represents mechanical power output. Although the illustrated equivalent circuit 13 neglects certain losses, this circuit 13 is commonly recognized and used. XS and XR represent stator leakage reactance and rotor leakage reactance, respectively, and XM represents magnetizing reactance.

Figure 2:
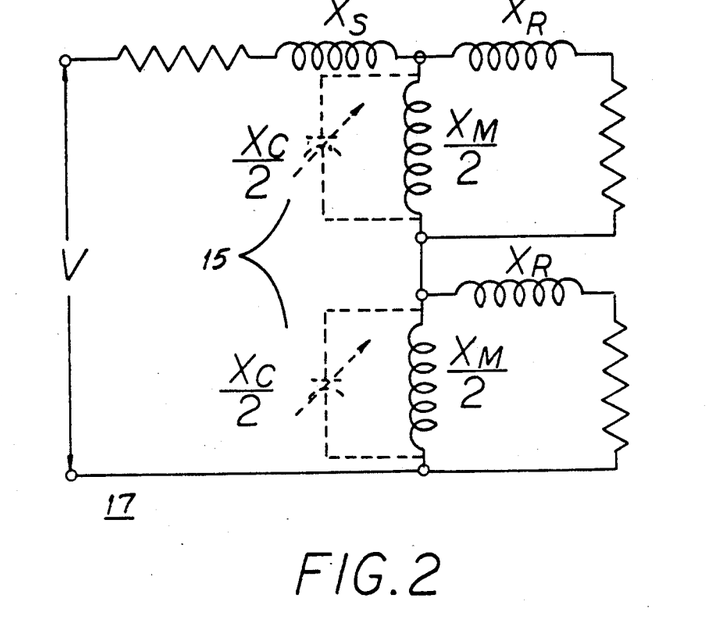
FIG. 2 shows an equivalent circuit of a single phase induction motor with capacitive reactances shown in dotted outline.

Referring to FIG. 2 and momentarily disregarding the variable capacitors 15 shown in dotted outline, there is shown the approximate equivalent circuit 17 of a single phase induction motor under running conditions. Under blocked rotor conditions, the equivalent circuit of such a single phase motor is closely similar to that of FIG. 1. The symbols XS, XR and XM used in FIG. 2 have the same meaning ascribed to them above.

Characteristics of Saturable Reactors

Figures 3, 5:
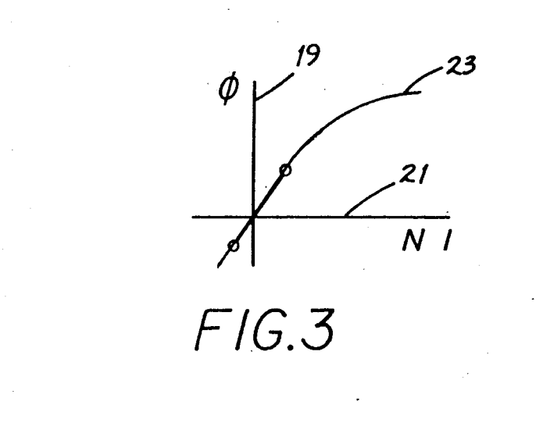
FIGS. 3, 4 and 5 are curves showing the inductive characteristics of a saturable reactor having a D-C control winding, the vertical axes representing reactor flux and the horizontal axes representing ampere-turns of the D-C control winding.
Figure 4:
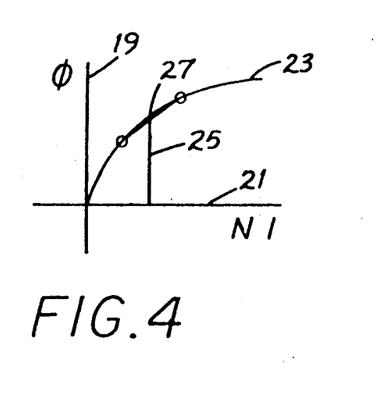
Figure 5:
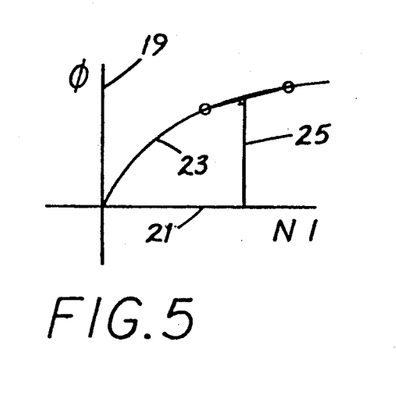

FIGS. 3, 4 and 5 illustrate the inductive characteristics of a saturable reactor having a D-C control winding. The vertical axis 19 represents the flux inside the reactor while the horizontal axis 21 represents the ampere-turns (NI) of the D-C control winding. Assuming a predetermined number of turns for a control winding, the horizontal axis 21 generally represents the magnitude of D-C current flowing through the control winding.

It is important to appreciate that the inductance of the saturable reactor is represented by the slope of the curve 23 at a particular location along the curve 23. The reactor inductance is represented by that slope where the curve 23 is intersected by a vertical line 25 which also intersects the horizontal axis 21 at that point representing the magnitude of the D-C control current.

As shown in FIG. 3, the absence of a D-C control current will result in a maximum inductance of the reactor as represented by the relatively steep slope of the curve 23 as it passes through zero. At a moderate level of D-C current, represented by the position of line 25 in FIG. 4, the slope of the curve 23 at the intersection point 27 is reduced somewhat, indicating a reduced reactor inductance. At a still higher level of D-C current as illustrated in FIG. 5, the slope of the curve 23 and therefore the reactor inductance will be further reduced. If the magnitude of the D-C current is made to be sufficiently high, the reactor core will be saturated, the curve 23 will be essentially horizontal at the intersection point of the aforementioned vertical line 25 and the inductance of the reactor will be represented to be essentially zero.

Characteristics of Induction Motors

Figure 6:
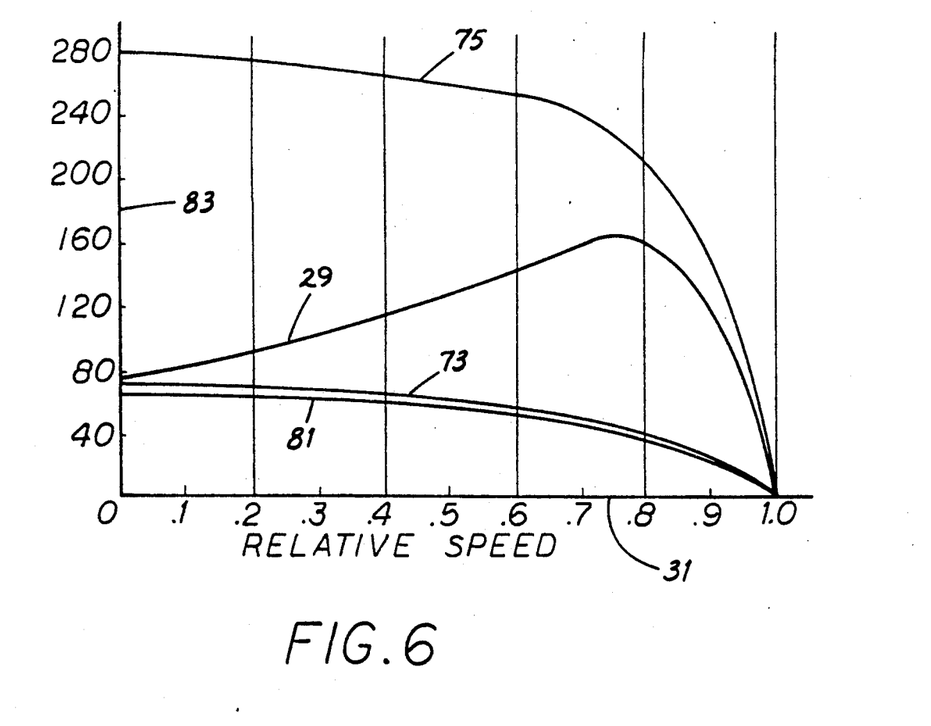
FIG. 6 comprises a set of curves showing the torque-speed and motor current characteristics of a standard induction motor and of an induction motor equipped with the inventive controller, both instances being with a constant voltage, constant frequency power source applied to the motor.

The curve 29 of FIG. 6 shows the torque-speed characteristic of a typical squirrel cage induction motor. The horizontal axis 31 is labeled in the commonly used "per unit" nomenclature and is applicable irrespective of the number of machine poles or of the frequency of the source applied to the motor terminals. Thus, for an induction motor having a synchronous speed of 1800 rpm (1.0 per unit) at 60 Hz, nominal full load rated speed would be about 1750 rpm or about 0.97 per unit. From the curve 29, it will be observed that maximum torque occurs at about 0.76 per unit speed and that the torque available at standstill is about equal to that available at 0.95 per unit speed. FIG. 6 is plotted for an applied line frequency of 60 Hz.

Characteristics of Frequency Converters

Figure 7:
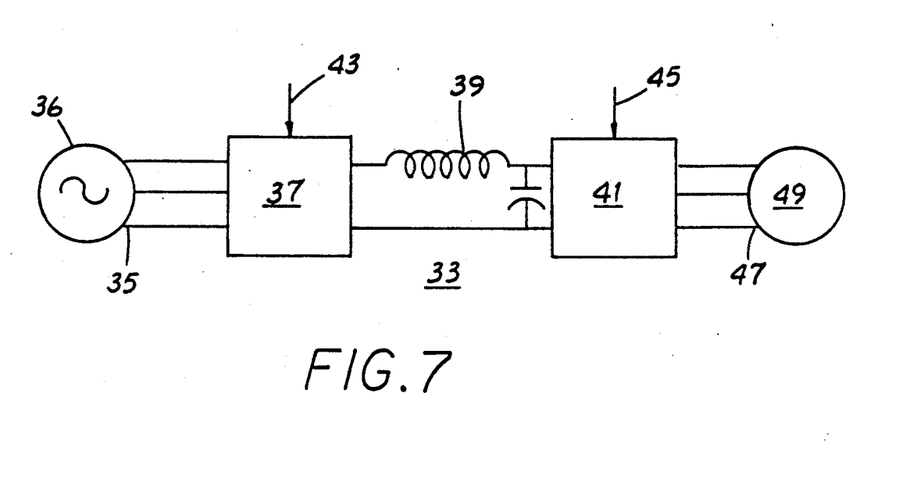
FIG. 7 is a representative diagram of a voltage and frequency controlled converter.

A representative diagram of a commonly available voltage and frequency controlled converter 33 is shown in FIG. 7. The converter 33 includes terminals 35 for applying a three phase constant frequency, constant voltage source 36, a rectifier 37, a filter 39 and an inverter 41. A voltage control signal, symbolized by the arrow 43, is applied to the rectifier 37 and a frequency control signal, symbolized by the arrow 45, is applied to the inverter 41. The output terminals 47 are connected to a three phase induction motor 49. A-C power at a constant frequency and voltage is applied to the terminals 35 and rectified to D-C power. This power is then processed by the filter 39 to remove harmonics and thereafter fed to the inverter 41. The output of the inverter 41 has both variable frequency and variable voltage capabilities so that the ratio of voltage magnitude to frequency is maintained substantially constant over the entire frequency range. This maintains a substantially constant level of magnetic flux in the motor 49.

Discussion of the Invention

Figure 8:
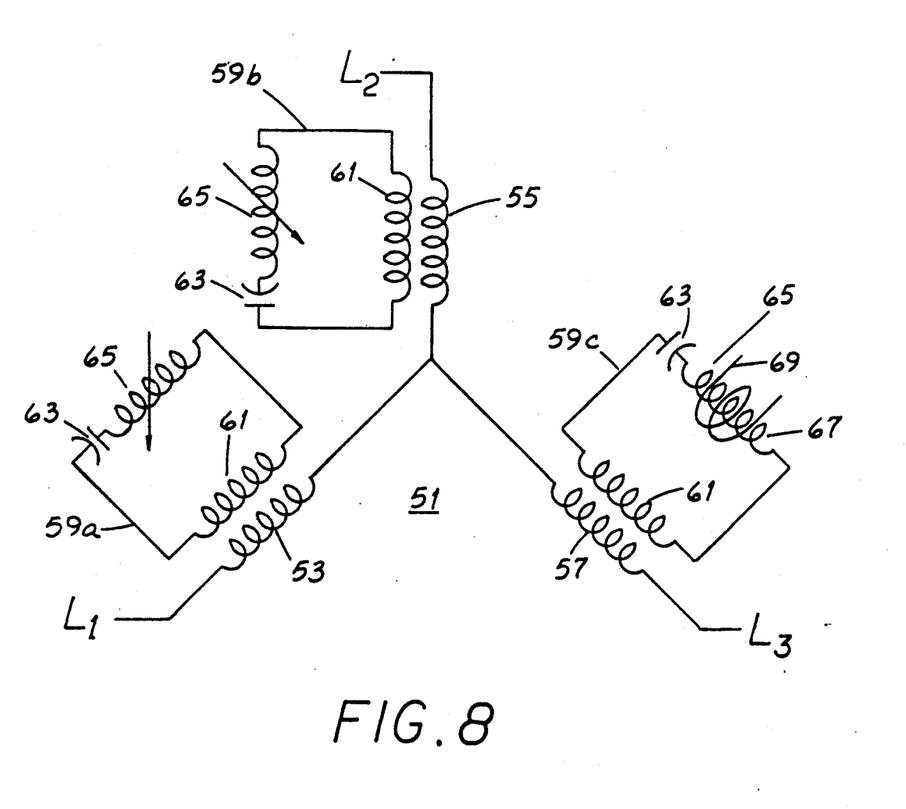
FIG. 8 is a representative schematic diagram of a three phase, wye connected induction motor equipped with the inventive controller.

Referring next to FIG. 8, a three phase induction motor 51 is symbolically shown to include first, second and third stator windings, 53, 55, and 57 respectively. These windings 53, 55, 57 are connected in what is commonly known as a wye configuration although a delta configuration may be used. A control loop 59a, 59b or 59c is provided for each stator winding 53, 55, 57 and each control loop 59a, 59b, 59c includes an auxiliary winding 61, a capacitor 63 and a saturable reactor 65. Each auxiliary winding 61 is electro-magnetically coupled to its associated stator winding, 53, 55, 57 preferably by placing the auxiliary winding 61 in the same slots as its associated stator winding 53, 55, 57. It is to be noted that each control loop 59a, 59b, 59c is devoid of a direct electrical connection to the motor 51, coupling being electromagnetic only.

Those saturable reactors 65 which form a part of the control loops adjacent windings 53, 55 are shown symbolically while that reactor 65 in the loop adjacent winding 57 is shown to include the reactor inductive winding 67 and the separate D-C control winding 69.

Referring additionally to FIGS. 1 and 2, the placement of the auxiliary winding 61 in an electromagnetically coupled relationship to a stator winding 53, 55, 57 and the incorporation of the capacitor 63 and the variable saturable reactor 65 in each control loop 59a, 59b, 59c will result in a capacitive reactance XC which is "reflected" into the electromagnetic motor circuit. This reflected capacitive reactance XC is shown in dotted outline in FIGS. 1 and 2. It is to be understood that with respect to FIG. 2, the magnetizing reactance XM is represented as two such reactances, each having one-half the value of XM. Correspondingly, the capacitive reactance XC is likewise represented to have two segments, each having a value of one-half XC.

The purpose of the controller 10 is to substantially neutralize or resonate with the parallel combination of XM and XR over a relatively wide range of speeds. In a motor 51 (FIG. 8) to which the applied line frequency is constant, 60 Hz for example, the value of the inductive reactance of the parallel combination of XM and XR will increase as the speed of the motor 51 increases from standstill to rated speed. Accordingly, the capacitive reactance XC of the control loop 59a, 59b, 59c, as reflected into the motor 51, must likewise increase with increasing speed if the reactances XM and XR are to be substantially "tuned out" over this speed range. Stated another way, the capacitive reactance XC of the control loop 59a, 59b, 59c must increase with increases in motor speed so that the natural or resonant frequency of the rotor impedance-magnetizing impedance-control loop capacitor 63 and reactor 65 circuit increases as motor speed increases.

This is accomplished by progressively increasing the D-C current in the D-C control winding 69 and such increases are generally proportional to motor speed. However, it is apparent from the foregoing that this function is not linear. Therefore, a suitable controller 10 has embedded therein the curve for selecting a D-C control current which correlates with an instantaneous speed. Such techniques are well known in the control art.

In similar fashion, the controller 10 improves the performance characteristics of an induction motor 49 driven by a converter such as the converter 33 shown in FIG. 7. However, in this instance, the signal detected by the controller 10 is the frequency of the power applied at the motor terminals 47 rather than speed. As with the constant frequency arrangement described above, a preferred controller 10 has embedded therein the control algorithm equivalent to the equation correlating the applied frequency and the current in the D-C control winding 69 so that resonance may substantially be attained over a range of frequencies.

From the foregoing and irrespective of whether the drive system involves applied power at a constant voltage and frequency or at a varying voltage and frequency, the controller 10 can be arranged in any one of several ways. For example, the controller 10 can be configured to provide a continuum of changing capacitive reactances XC over a range of motor speeds in which performance is desired to be improved. In a drive system using applied power at a constant voltage and frequency, a preferred range is from standstill to full load rated speed.

In a system where the power applied has variable voltage and frequency characteristics, the range of motor speeds is defined, at one boundary, by that speed occurring when voltage at the minimum frequency is applied to the motor terminals such as terminals 47. The other boundary of the range would be at that speed occurring when voltage at the maximum frequency is applied to the motor terminals 47. It is to be understood that a controller 10 which operates over a narrower range of speeds or frequencies will nevertheless yield very beneficial results.

In the alternative and with respect to a system having power applied at a constant voltage and frequency, the controller 10 may be arranged in a "stepped" fashion. That is, it may be arranged so that for each of at least two motor speeds, the control loop 59a, 59b, 59c has a capacitive reactance XC which is generally in resonance with the magnetizing reactance XM and the rotor leakage reactance XR. The curve 71 of FIG. 9 suggests how this might be accomplished. This curve 71 is a computed graph of the reactance XL of the saturable reactor necessary to achieve the foregoing resonance, the reactance XL being plotted against per unit speed. It will be noted that the value of the reactor reactance XL is essentially constant from 0 speed to about 0.75 per unit speed. It will also be noted that the reactance is essentially 0 at about 0.95 per unit speed. This curve 71 was computed based upon an exemplary 10 horsepower 3 phase motor to which a constant line voltage at 60 Hz is applied.

Figure 9:
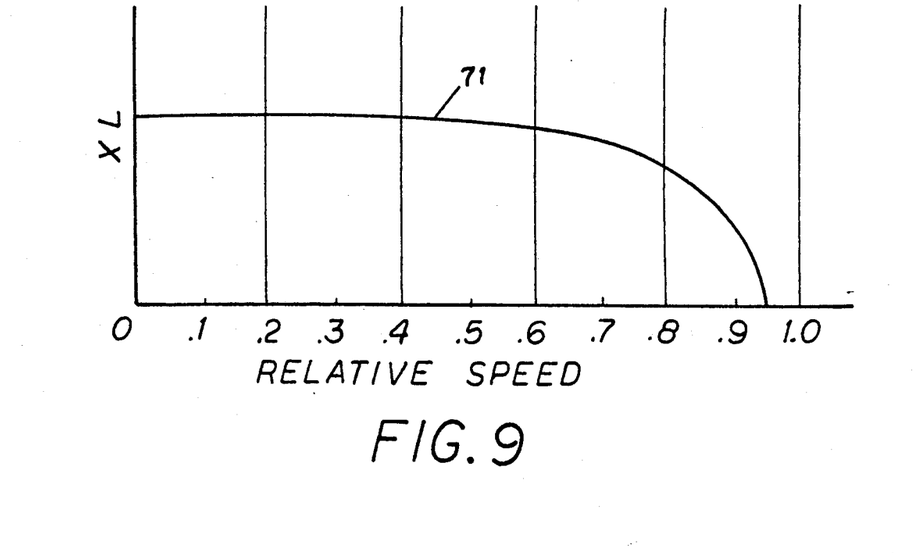
FIG. 9 is a curve showing reactance of a saturable reactor plotted against per-unit speed.

In view of the shape of the curve 71 in FIG. 9, a first reactor value could be selected to prevail as the motor accelerates from standstill to about 0.75 per unit speed and, in stepped fashion, a second value selected as the motor further accelerates to about 0.95 per unit speed. Since the reactance of the reactor is negligible at the latter speed, it could be shorted out during motor running conditions.

In similar fashion, the controller 10 can be arranged in stepped fashion for a drive involving adjustable voltage and frequency. For example, the controller 10 can be arranged to provide one value of capacitive reactance XC up to 20 Hz applied, another value between 20 Hz and 40 Hz applied and a third value from 40 Hz up to 60 Hz. The resulting range of motor speeds is defined, at one boundary, by that speed occurring when voltage at the minimum frequency is applied at the motor terminals such as terminals 47. The other boundary of the range is defined by that speed occurring when voltage at the maximum frequency is applied at the motor terminals 47. In a controller 10 used with an adjustable frequency drive, these boundaries may be 5 Hz and 60 Hz, respectively. The lower boundary will not be 0 Hz since no starting torque would result.

Figure 10:
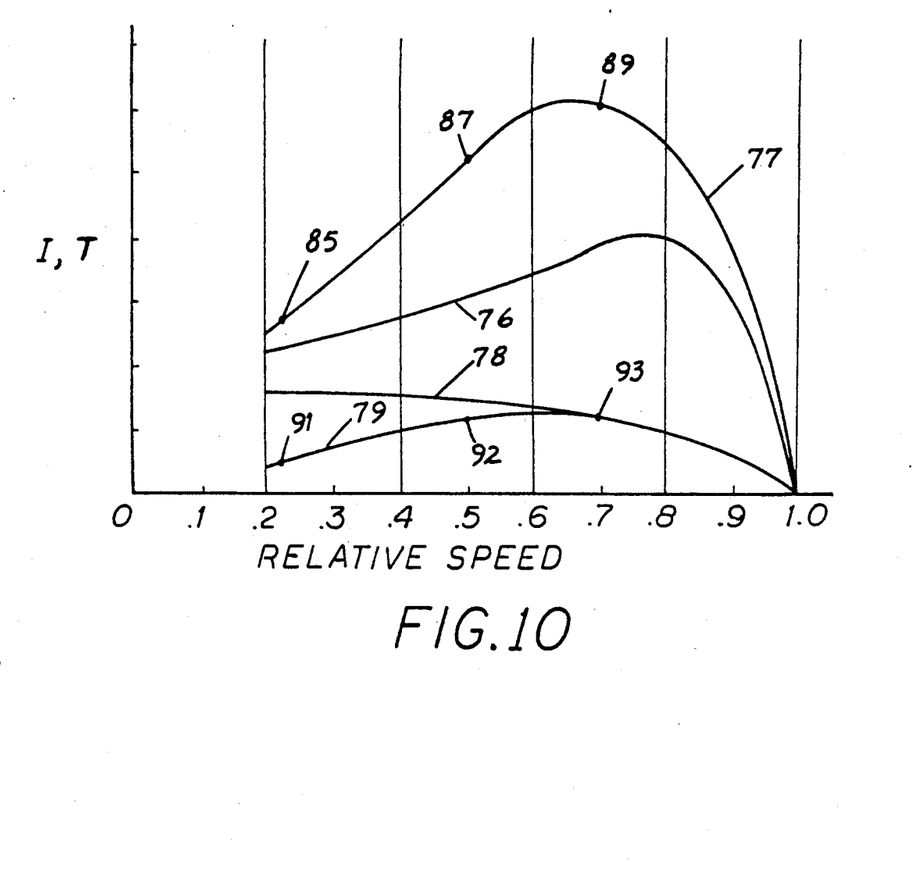
FIG. 10 comprises a set of curves showing the torque-speed and motor current characteristics of a standard induction motor and of an induction motor equipped with the inventive controller, both instances involving a variable voltage, variable frequency power source applied to the motor; and, FIG. 11 is a representative schematic diagram of a three phase, wye connected induction motor shown with the inventive controller applied thereto.

Component curves 73, 75, 77, 79 of FIGS. 6 and 10 were computed based on a 10 HP, 3 phase, 440 volt, 60 Hz, 8 pole squirrel cage motor described in a standard textbook titled, "Electric Machines" by M. S. Sarma. FIGS. 6 and 10 illustrate how the performance of an induction motor is improved by the use of the inventive controller 10. FIG. 6 includes the curve 29 which, as described above, is the torque speed curve of a common induction motor connected to an A-C power source of constant voltage and frequency. Curve 81 represents motor current of such a motor. In contrast, curve 75 illustrates the computed torque-speed characteristics of the same motor when used with the inventive controller 10. It will be noted that at all speeds from standstill up to about 0.9 per unit speed, the available torque at any speed is dramatically increased. Further, the torque available from the motor when the controller 10 is used is well in excess of the stall torque available at about 0.78 per unit speed with the motor alone—see curve 29.

This has very favorable implications for the acceleration of high inertia hard-to-accelerate loads. It is also apparent from the foregoing that starting torque is dramatically increased over that which is available from the conventional motor alone. Compare the intersection points of curves 29 and 75 with the vertical axis 83.

It will also be noted that notwithstanding the dramatic improvements in available torque over a relatively wide range of motor speeds, the motor current increases only slightly when the motor is used with the controller 10. This increase in motor current is the difference, measured vertically, between the current represented by a point on curve 81 with that represented by a corresponding point on curve 73. Even with such slight current increases, the ability to accelerate loads more rapidly by using the controller 10 will result in reduced motor heating over that which would result by using a standard induction motor to drive the same load. The more a load tends to be of the high inertia, hard-to-accelerate type and the more frequently this load is stopped and started, the greater will be the reduction in motor heating that results from using the controller 10. The curves 73 and 75 are computed and are based upon a constant voltage 60 Hz supply.

Referring next to FIG. 10, it will be apparent from the curves 77, 79 (representing computed values of torque and current, respectively), when compared with curves 76 and 78 that the controller 10 will also be of great benefit in variable frequency applications. Curves 76 and 78 represent torque and current, respectively, (both plotted against speed) and have been computed for an applied line frequency of 60 Hz. However, curves 76, 78 are approximately representative of torque and current when a voltage of increasing frequency is applied to a standard motor.

Curve 77 represents the computed torque available when the controller 10 is used in a variable frequency drive system. This curve 77 was developed by computing three points, point 85 at 20 Hz, point 87 at 40 Hz and point 89 at 60 Hz. The curve was then interpolated between those points 85, 87, 89. It will noted that at speeds ranging from about 0.2 per unit up to about 0.9 per unit, the torque available when using the controller 10 is significantly greater than that available using the motor alone. The curve 79 was likewise developed by interpolation from computed points, point 91 being at 20 Hz, point 92 being at 40 Hz and point 93 being at 60 Hz. It will be observed that at lower motor speeds, below about 0.65 per unit, the current is substantially reduced below that which would occur without the use of the controller 10. For motor speeds generally below 0.25 per unit, there is little difference in the motor torque available, with or without the use of the controller 10. However, the reduction in current, as shown by curve 79, means that in many instances the controller 10 and a motor can be applied to drive loads of the hard-to-accelerate type without increasing motor heating over that which would result using the motor alone.

Based on the foregoing computations relating to the motor described in the Sarma text, a preferred auxiliary winding 61 has more turns than the number of turns of the main stator winding 53, 55, 57. In a highly preferred embodiment, the ratio of the number of turns in the auxiliary winding 61 to that in the associated main winding 53, 55, 57 will be in the range of 2.5-3.0:1. Each control loop 59a, 59b, 59c was computed to have a 9 microfarad capacitor 63 and the inductive reactance of the saturable reactors 65 could be varied from zero to 90 ohms. The rating of each capacitor 63 and each reactor 65 is 2 kva at 762 volts.

Figure 11:
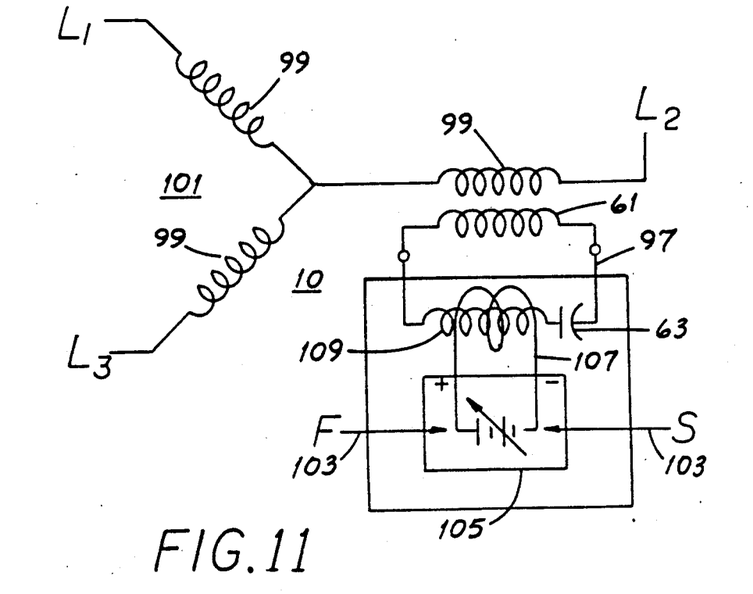

Referring finally to FIG. 11, the controller 10 is shown to be coupled by the auxiliary winding 61 of the control loop 97 to one stator winding 99 of a wye 101 connected motor. The controller 10 has inputs 103 for the motor parameters of frequency (F) and/or speed (S), respectively. These inputs 103 are used to vary the current produced by the D-C source 105 coupled to the control winding 107 of the saturable reactor 109. As described above, either input 103 may be used to vary the D-C control current and control may be in stepped fashion or in a continuum over a range of motor speeds. It is to be understood that in practice, the motor 101 would have a control loop 97 associated with each stator winding 99.

When the controller 10 is used with a 3 phase motor such as motor 101, the D-C currents in each of the three reactor control windings 107 are preferably equal to one another and are adjusted in unison by the control module of a single controller 10. Notwithstanding that the foregoing discussion primarily describes the controller 10 used with a 3 phase motor, the controller 10 provides similar benefits when used with single phase or other multiphase machines. It should also be understood that if motor performance is to be improved at only a single speed (in a constant frequency application where the motor accelerates from standstill to rated speed) or at only a single frequency (as in a variable frequency application), an appropriate capacitor 63 can be selected, the auxiliary winding 61 and the capacitor 63 connected in a control loop and the saturable reactor 65 alone omitted.

While the principles of this invention have been described in connection with specific embodiments, it should be understood clearly that these descriptions are made only by way of example and are not intended to limit the scope of the invention.

What is claimed is:

1. A controller for an induction motor of the type having a magnetizing reactance, a stator leakage reactance, a rotor leakage reactance, a stator having at least one stator winding and a rotor mounted for rotation in an electromagnetically coupled relationship to the stator, the controller comprising:

a control loop including an auxiliary winding, a capacitor and a saturable reactor which is controllably adjustable to have a variable inductance, the auxiliary winding being arranged in an electromagnetically coupled relationship to the stator winding so that the reactance of the control loop is effectively in parallel with the magnetizing reactance and the rotor leakage reactance, the control loop being devoid of an electrical connection to the motor;

the inductance of the reactor being adjusted such that the capacitive reactance of the control loop, as electromagnetically reflected into the motor, is generally in resonance with the parallel combination of the magnetizing reactance and the rotor leakage reactance;

the output torque of the motor thereby being improved.

2. The controller of claim 1 wherein the inductance of the reactor is adjusted so that the capacitive reactance of the control loop is generally in resonance with the magnetizing reactance and the rotor leakage reactance.

3. A controller for an induction motor of the type having a magnetizing reactance, a stator leakage reactance, a rotor leakage reactance, a stator having at least one stator winding and a rotor mounted for rotation in an electromagnetically coupled relationship to the stator, the controller comprising:

a control loop including an auxiliary winding, a capacitor and a saturable reactor which is controllably adjustable to have a variable inductance, the auxiliary winding being arranged in an electromagnetically coupled relationship to the stator winding so that the reactance of the control loop is effectively in parallel with the magnetizing reactance and the rotor leakage reactance, the control loop being devoid of an electrical connection to the motor;

the inductance of the reactor being adjusted such that the capacitive reactance of the control loop, as electromagnetically reflected into the motor, is generally in resonance with the parallel combination of the magnetizing reactance and the rotor leakage reactance over a range of motor speeds;

said stator having at least two terminals for connecting to an A-C voltage source having a constant frequency and wherein the motor has a rated running speed and upon connection to said voltage source the inductance of the reactor is adjusted at least once as the motor accelerates from standstill to rated running speed.

4. The controller of claim 3 wherein the inductance of the reactor is substantially continuously adjusted over a range of motor speeds.

5. A controller for an induction motor of the squirrel cage type including a stator and a stator winding having at least two terminals for connecting to a source of A-C power which has a maximum frequency, further having a magnetizing reactance and a rotor leakage reactance, said motor having a rotor mounted for rotation in an electromagnetically coupled relationship to the stator, the controller comprising:

a control loop including an auxiliary winding, a capacitor and a saturable reactor which is controllably adjustable to have a variable inductance, the auxiliary winding being arranged in an electromagnetically coupled relationship to the stator winding so that the reactance of the control loop is effectively in parallel with the parallel combination of the magnetizing reactance and the rotor leakage reactance, the control loop being devoid of an electrical connection to the motor;

the value of the capacitor being selected by postulating a control loop which is devoid of the reactor and which therefore has a capacitive reactance, as electro-magnetically reflected into the motor, which is generally in resonance with the magnetizing reactance and the rotor leakage reactance at said maximum frequency of said source of A-C voltage;

the inductance of the reactor being adjustable over a range of motor speeds;

for substantially all speeds within the range of motor speeds, the output torque of the motor thereby being made greater than that available from the motor in the absence of the controller.

6. A controller for a squirrel cage induction motor including a stator winding having at least two terminals for connecting to a source of A-C power capable of its frequency being varied from a minimum to a maximum frequency, further having a magnetizing reactance and a rotor leakage reactance, said motor having a rotor mounted for rotation in an electromagnetically coupled relationship to the stator, the controller comprising:

a control loop including an auxiliary winding, a capacitor and a saturable reactor which is controllably adjustable to have a variable inductance, the auxiliary winding being arranged in an electromagnetically coupled relationship to the stator winding so that the reactance of the control loop is effectively in parallel with the parallel combination of the magnetizing reactance and the rotor leakage reactance, the control loop being devoid of an electrical connection to the motor;

the value of the capacitor being selected by postulating a control loop which is devoid of the reactor and which therefore has a capacitive reactance, as electro-magnetically reflected into the motor, which is generally in resonance with the magnetizing reactance and the rotor leakage reactance at said maximum frequency when said terminals are connected to said source, the inductance of the reactor being adjustable over a range of motor speeds;

said range of motor speeds being defined by boundaries, one boundary being at that speed occurring when A-C power at the minimum frequency is applied to said terminals and the other boundary being at that speed occurring when A-C power at said maximum frequency is applied to the motor terminals.

7. The controller of claim 6 wherein the inductance of the reactor is adjusted so that for each of at least two of the frequencies of electrical power applied to the motor terminals, the control loop has a capacitive reactance, as electro-magnetically reflected into the motor, which is generally in resonance with the magnetizing reactance and the rotor leakage reactance.

8. The controller of claim 6 wherein the inductance of the reactor is adjusted so that for substantially all motor speeds within the range of motor speeds, the control loop has a capacitive reactance, as electro-magnetically reflected into the motor, which is generally in resonance with the magnetizing reactance and the rotor leakage reactance.

9. The controller of claim 6 wherein the value of the capacitor so selected is based on said maximum frequency being 50 Hz.

10. The controller of claim 6 wherein the value of the capacitor so selected is based on said maximum frequency being 60 Hz.

11. The controller of claim 6 wherein the value of the capacitor so selected is based on said maximum frequency being in excess of 60 Hz.

12. The combination of an induction motor and a controller therefor, the motor being of the squirrel cage type having at least two motor terminals for connecting a source of A-C power to the motor and further having a magnetizing reactance, a stator leakage reactance, a rotor leakage reactance and, when energized, operating parameters including an applied line frequency and a rotational speed, the combination comprising:

motor including:

a stator with at least one stator winding;

a rotor mounted for rotation in an electromagnetically coupled relationship to the stator;

an auxiliary winding in an electromagnetically coupled relationship to the stator winding, the auxiliary winding forming a part of a control loop;

a controller having a capacitor and a saturable reactor which is controllably adjustable to have a variable inductance, the reactor having an A-C inductive winding and a D-C control winding, the inductive winding, the capacitor and the auxiliary winding being connected in series to form a control loop, the reactance of which is effectively in parallel with the parallel combination of the magnetizing reactance and the rotor leakage reactance, the control loop being devoid of an electrical connection to the motor;

the controller being arranged to detect a signal representing a motor parameter which varies over a range;

the controller also being arranged to change the magnitude of the current in the D-C control winding based on the detected signal so that the capacitive reactance of the control loop, as reflected into the motor, is generally in resonance with the magnetizing reactance and the rotor leakage reactance for at least two values of the motor parameter;

the output torque of the motor thereby being improved over that exhibited by the motor in the absence of the control loop.

13. The combination of claim 12 wherein the signal detected represents the rotational speed of the motor and the applied line frequency is 50 Hz.

14. The combination of claim 12 wherein the signal detected represents the rotational speed of the motor and the applied line frequency is 60 Hz.

15. The combination of claim 12 wherein the signal detected represents applied line frequency.

16. A controller for an induction motor of the type having a magnetizing reactance, a stator leakage reactance, a rotor leakage reactance, a stator having at least one stator winding and a rotor mounted for rotation in an electromagnetically coupled relationship to the stator, the controller comprising:

- a control loop including an auxiliary winding and a capacitor, the auxiliary winding being arranged in an electromagnetically coupled relationship to the stator winding so that the capacitive reactance of the control loop is effectively in parallel with the magnetizing reactance and the rotor leakage reactance, the control loop being devoid of an electrical connection to the motor;
- the value of the capacitor being selected such that the capacitive reactance of the control loop, as electromagnetically reflected into the motor, is generally in resonance with the parallel combination of the magnetizing reactance and the rotor leakage reactance for an operating parameter of the motor;

the output torque of the motor thereby being improved at such operating parameter.

17. The controller of claim 16 wherein the motor is coupled to a constant voltage, constant frequency source of electrical power and wherein the operating parameter is a rotational speed.

18. The controller of claim 16 wherein the motor is coupled to a variable voltage, variable frequency source of electrical power and wherein the operating parameter is a voltage frequency.

* * * * *